May 23, 1972  E. SUNDERMAN ET AL  3,664,677

TOOL HOLDER

Filed June 15, 1970  2 Sheets-Sheet 1

INVENTORS
MERLE HILLIARD
ELWIN SUNDERMAN

BY
Julius L. Rubinstein
ATTORNEY

United States Patent Office 3,664,677
Patented May 23, 1972

3,664,677
TOOL HOLDER
Elwin Sunderman, Inglewood, and Merle Hilliard, Los Angeles, Calif., assignors to Sonnet Tool and Manufacturing Co., Hawthorne, Calif.
Filed June 15, 1970, Ser. No. 46,229
Int. Cl. B23b 31/04
U.S. Cl. 279—83                                    13 Claims

ABSTRACT OF THE DISCLOSURE

The tool holder is a generally cylindrical body with one end threaded and with a cylindrical concentric tail integrally attached to the opposite end. A bore for receiving the stem of a machine tool extends through the bore and the tail. A bead, semi-circular in cross-section, is formed on the opposite end of the cylindrical body adjacent the plane of the junction between the cylindrical tail and the cylindrical body. The region immediately adjacent the bead is relieved axially a distance on the order of a sixth of the diameter of the cylindrical body. The diameter of the beaded end of the cylindrical body is slightly smaller than the diameter of the cylindrical body for ease in penetrating the bore of the adapter and the relieved axially extending region prevents the tool holder from becoming jammed in the bore of the adapter. The cylindrical surface of the body and the cylindrical surface of the tail are precision ground and then these surfaces fit into a correspondingly dimensioned bore and counter-bore in the adapter. In this way the tool holder is supported in the adapter on spaced bearing surfaces for greater stability.

BACKGROUND AND BRIEF SUMMARY

Tool holders heretofore in use were generally cylindrical in shape with a bore extending therethrough. The tool holder is used in combination with an adapter which is generally cylindrical and is provided with a coaxial precision ground bore to receive the tool holder. Means are provided on the adapter which coact with the tool holder to lock the tool holder rigidly inside the adapter. These means require the tool holder to have a particular angular orientation with respect to the adapter. This is accomplished by forming the tool holder with a cylindrical tail integrally formed on the end of the tool holder. This tail is provided with radially projecting keys which fit into key slots formed in the adapter when the tool holder has the proper orientation with respect to the adapter.

However, the difference in diameter between the bore in the adapter and the diameter of the tool holder is on the order of one or two ten-thousandths of an inch. This creates substantial problems because if the tool holder is not precisely aligned with the axis of the bore in the adapter, the tool holder becomes jammed part way inside the adapter. If this happens it is very difficult to remove the tool from the adapter and reinsert it. This difficulty is substantially increased when the tool holder is large and heavy and when the tool holder must be forced upwardly into a downwardly open bore in the adapter. This work often involves a substantial loss of time and the tool holder and adapter are often damaged in trying to separate them.

In this invention the problem of jamming between the tool holder and the cylindrical adapter has been eliminated by providing the end of the tool holder with a particular formation. This formation, however, involves relieving in an axial direction, a substantial part of the bearing surface of the tool holder. This loss of bearing surface, when tolerances are very close, decreases the stability of the tool holder inside the adapter, and this decrease in stability is not tolerable.

What is needed therefor, and comprises an important object of this invention, is to provide a tool holder which can be easily inserted inside of an adapter without any danger of jamming.

A further object of this invention is to provide a tool holder which can be easily mounted inside the bore of an adapter without danger of jamming and which can be held rigidly therein.

Still a further object of this invention is to modify a tool holder so it can be easily inserted in an adapter without increasing the size or weight of the tool holder or the size or shape of the adapter.

These and other objects of this invention will become more apparent when better understood in the light of the accompanying drawings and specification wherein.

Figure 1:
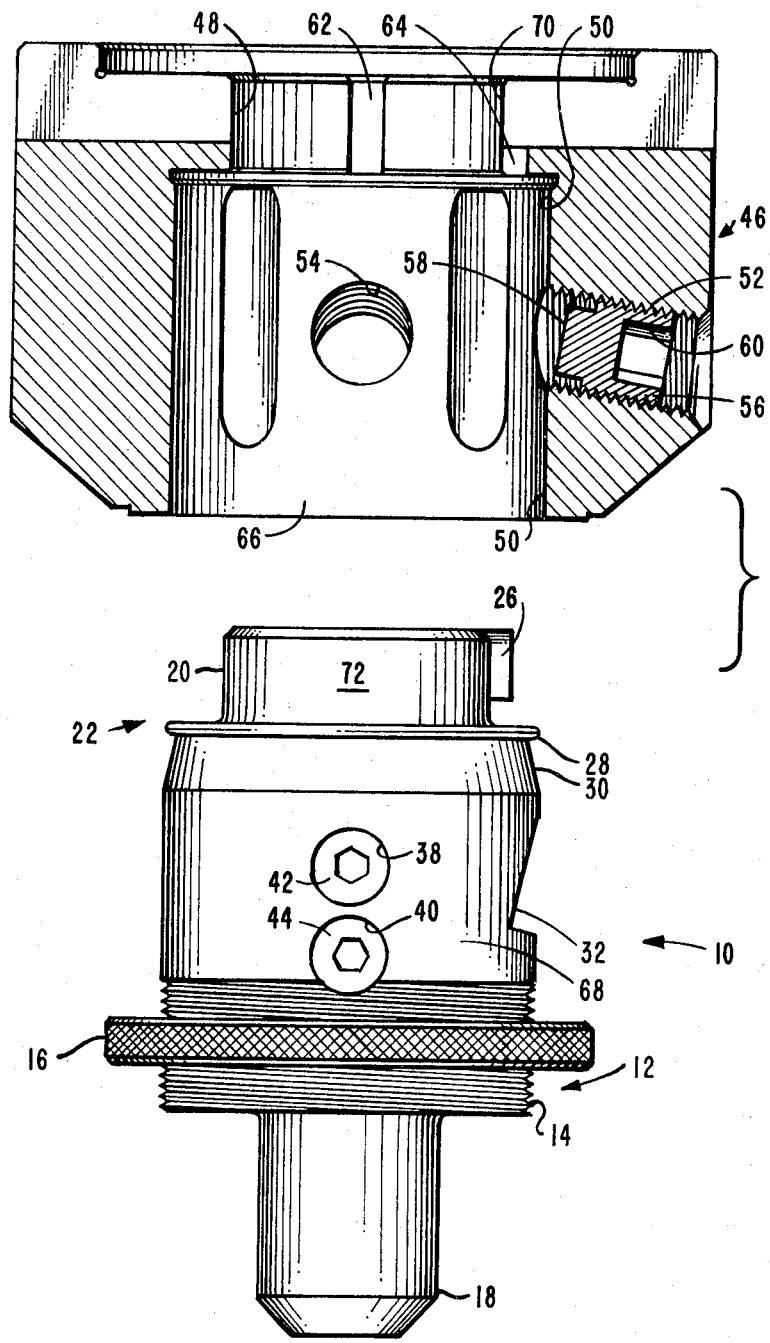
FIG. 1 is an exploded elevational and sectional view showing the tool holder separated from the adapter.

Referring now to FIG. 1 of the drawing, a tool holder indicated generally by the reference numeral 10 is in this particular embodiment a generally cylindrical metal body. The forward end 12 of the surface cylindrical body is provided with threads 14. A knurled nut 16 is threadedly mounted on these threads. In the particular embodiment shown the tool holder is provided with a forwardly extending stem 18 for receiving the shank or stem of a tool and holding the tool inside the tool holder with greater stability. A generally cylindrical tail 20 is integrally formed on the rear end 22 of the tool holder. This tail is provided with removably mounted radially projecting keys 24 and 26 for reasons to become apparent below.

The rear end portion 22 of the tool holder is provided with an integrally formed bead 28 which in the embodiment shown is semi-circular in cross-section. For a tool holder which is approximately three and a half inches in diameter the semi-circular bead might have a radius of .093 inch. The diameter of the beaded portion 28 of the tool holder is slightly less than the diameter of the remaining portion of the cylindrical tool holder and in the area of the close tolerances involved, the difference in diameter is on the order of one or two ten-thousandths of an inch. The region 30 immediately adjacent bead 28 is relieved in an axial direction, and in the particular embodiment shown the relieved portion has the shape of a truncated cone, although this shape is not critical. As will be explained below, the axial length of the relieved portion 30 necessary to prevent jamming in the adapter, depends on the diameter of the tool holder, and for a tool holder of around three and a half inches in diameter, an axially extending relieved portion on the order of a half inch is suitable.

As shown in FIG. 1, the tool holder is provided with two whistle notches 32 and 34. These whistle notches are ground flat at an angle of about 68 degrees with respect to a plane containing the radius of the tool holder.

Figure 3:
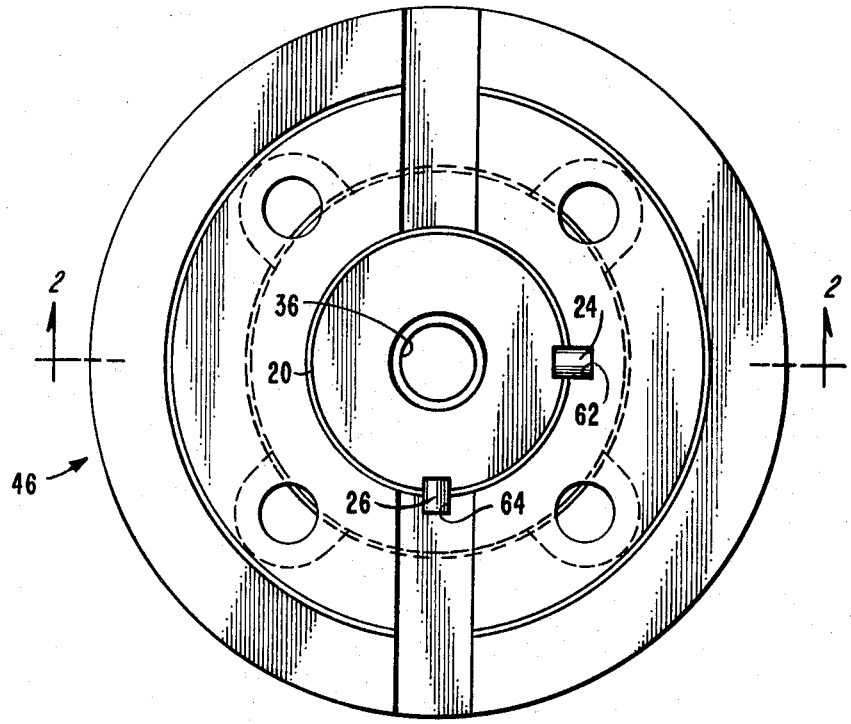
FIG. 3 is a rear view of the adapter with the tool holder mounted inside.
Figure 2:
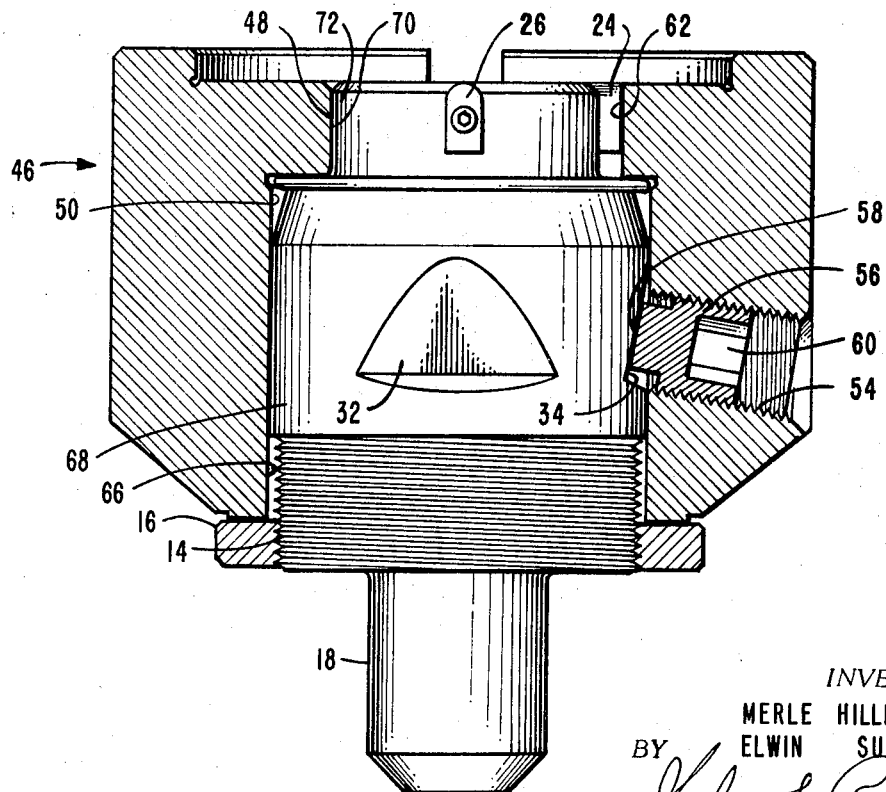
FIG. 2 is an elevational view, partly in section, showing the tool holder mounted in the adapter.

A tool receiving bore 36 extends completely through the tool holder for receiving the stem or shank of a tool, see FIG. 3. As best seen in FIG. 1, the tool holder is provided with two axially spaced radially inwardly extending threaded bores 38 and 40. These bores communicate with the bore 36 extending along the axis of the tool holder. Counter sunk set screws 42 and 44 are threadedly mounted in bores 38 and 40. With this arrangement, when the stem or shank of a tool is mounted in the tool holder, set screws 42 and 44 are screwed into engagement with the shank or stem of the tool and rigidly lock the tool insider the tool holder.

The adapter for the tool holder indicated generally by the reference numeral 46 is generally cylindrical in shape. A bore 48 extends through the axis of the adapter and this bore communicates with a counter-bore 50, as shown in FIG. 1. The adapter 46 is also provided with two threaded bores 52 and 54, see FIG. 1. These bores are formed at an angle to the radius of the adapter and the angle is selected so that when the tool holder is mounted inside the adapter and is properly orientated, the axis of bores 52 and 54 are perpendicular to the flat of the whistle notches 32 and 34. Screws 56 are threaded inside bores 52 and 54 as shown in FIG. 1. The screws 56 are provided with a flat inner surface 58 and a hexagonal recess 60 shaped to receive a hexagonal wrench is at the opposite end. With this arrangement, when the tool holder 10 is mounted inside the counter-bore 50 of the adapter 46 with the correct orientation, then screws 56 can be screwed down into the adapter until the flat inner surface 58 engages the flat surfaces of the whistle notches to rigidly lock the tool holder inside the adapter.

To make certain the tool holder has the correct orientation when mounted inside the adapter, the adapter is provided with slots 62 and 64 designed to receive the radially projecting keys 24 and 26, see FIG. 3. It is noted that whistle notch 34, key, 24, and slot 62 must be in line with each other for correct orientation. Similarly, whistle notch 32, key 26, and slot 64 must be in line with each other. The diameter of the counter-bore 50 in the adapter 46 is on the order of one or two ten-thousandths of an inch greater than the diameter of the cylindrical body of the tool holder 10. The inner surface 66 of counter-bore 50 is precision ground to receive the precision ground cylindrical surface 68 of the tool holder 10.

The combination of the formation of bead 28 with the adjacent relieved portion 30 in the tool holder permits the tool holder to be inserted inside the precision ground counter-bore 50 without any danger or possibility of jamming.

However, the decrease in the precision ground bearing surface 68 caused by forming the relieved portion 30 decreases the stability of the tool holder inside the adapter. In order to compensate for this decreased stability the bearing surface must be increased without increasing the overall length and weight of the tool holder and completely redesigning the adapater. To do this, the inner surface 70 of bore 48 is precision ground and the cylindrical surface 72 of the tail 20 is also precision ground and is on the order of one or two ten-thousandths of an inch smaller than the diameter of the bore 48. With this arrangement, when a tool holder is mounted inside the bore there are two spaced cylindrical bearing surfaces which permit the tool holder to be mounted inside the adapter with great rigidity and without any increase in the weight or size of the tool holder and without changing the shape of the adapter.

Having described the invention, what we claim as new is:

1. A tool holder of a class described comprising a first body and a second body, one end of each of said bodies integrally attached to each other with the second body smaller than the first body and serving as a tail portion, surfaces of said first and second bodies precision ground to form spaced bearing surfaces to provide the tool holder with spaced bearing support regions, means formed on the end of said first body contiguous to said second body to permit the tool holder to be inserted tail first inside a close fitting recess in an adapter without jamming, said means formed on the end of said first body including a flanged edge portion and adjacent thereto an axially extending relieved portion intermediate said spaced bearing surfaces, said tool holder having a tool receiving bore extending at least part way there through, and means on said tool holder for releasably and rigidly holding a tool in the bore of said tool holder.

2. A tool holder of the class described comprising first and second cylindrical bodies, one end of each of said cylindrical bodies integrally attached to each other with the second cylindrical body smaller than the first cylindrical body and serving as a tail portion, surfaces of said first and second cylindrical bodies precision ground to form spaced bearing support surfaces to provide the tool holder with spaced bearing support regions, means formed on the end of said first cylindrical body contiguous to said second cylindrical body to permit the tool holder to be inserted tail first inside a close fitting bore and counter-bore in an adapter without jamming, said means formed on the end of said first cylindrical body including a flanged edge portion and adjacent thereto an axially extending relieved portion intermediate said spaced bearing surfaces, said tool holder having a tool receiving bore extending at least part way there through, and means on said tool holder for releasably and rigidly holding a tool in the bore of said tool holder.

3. A tool holder of the class described comprising a cylindrical body, the cylindrical surface of said body precision ground forming a first bearing surface, a bead formed on the end of said body, the diameter of the beaded portion of said body slightly less than the diameter of the cylindrical body, the region immediately adjacent the beaded portion of the cylindrical body recessed axially a distance sufficient to permit the cylindrical body to be inserted, bead first, inside a closely fitting cylindrical bore in an adapter without the possibility of jamming, said tool holder including an axially extending cylindrical tail portion, the cylindrical surface of said tail portion precision ground to provide the tool holder with a second bearing support whereby the tool holder has spaced supports inside the adapter, a tool receiving bore extending through said tool holder, and means on said tool holder for releasably and rigidly holding the stem of a tool inside said tool holder.

4. The tool holder described in claim 3 wherein the bead at the ends of the cylindrical body of the tool holder is semi-circular in cross-section.

5. The tool holder described in claim 4 wherein the tool holder is provided with whistle notches, said whistle notches having flat surfaces disposed at right angles with respect to each other and at an angle with respect to the radius of the cylindrical body, said tail of the tool holder provided with radially projecting alignment keys, said keys at right angles with respect to each other and aligned with said whistle notches.

6. The tool holder described in claim 5 wherein the end of the tool holder opposite the beaded portion is threaded for receiving a knurled adjusting nut.

7. An apparatus of the class described comprising in combination a tool holder and an adapter, said tool holder including a main portion and a tail portion, said main portion and said tail portion having precision ground bearing surfaces, said adapter having a bore and a counter-bore, the walls of said bore precision ground and shaped to receive and support the precision ground bearing surfaces of said tail portion in close fitting relationship, the walls of said counter-bore precision ground and shaped to receive and support the precision ground bearing surfaces of the main portion of the tool holder in close fitting relationship to provide the tool holder with two spaced regions of support in said adapter, means in said adapter coacting with means on said tool holder for releasably holding said tool holder in said adapter, said tool holder having a tool receiving bore extending at least combination a tool holder and an adapter, said tool holder releasably holding the stem of a tool holder in said tool holder bore, means formed on the end of said main portion contiguous to said tail portion so that the tool holder can be inserted inside the closely fitting precision ground counter-bore in said adapter without jamming, and said means formed on the end of said main portion including a flanged edge portion and adjacent thereto an axially extending relieved portion intermediate said bearing surfaces.

8. An apparatus of the class described comprising in combination a tool holder and an adapter, said tool holder including a cylindrical main portion and a cylindrical tail portion, said main portion and said tail portion having precision ground cylindrical bearing surfaces, said adapter having a cylindrical bore and a cylindrical counter-bore, the walls of said cylindrical bore precision ground and shaped to receive and support the precision ground cylindrical bearing surface of said tail portion in close fitting relationship, the walls of said cylindrical counter-bore precision ground and shaped to receive and support the cylindrical precision ground bearing surface of the main portion of the tool holder in close fitting relationship to provide a tool holder with two spaced regions of support in said adapter, means in said adapter coacting with means on said tool holder for releasably holding said tool holder in said adapter, said tool holder having a tool receiving bore extending at least part way therethrough, means in said tool holder for releasably holding the stem of a tool in said tool holder bore, means formed on the end of said main portion contiguous to said tail portion so that the tool holder can be inserted inside the cylindrical precision ground counter-bore in said adapter without jamming, and said means formed on the end of said main portion including a flanged edge portion and adjacent thereto an axially extending relieved portion intermediate said bearing surfaces.

9. An apparatus of the class described comprising in combination a tool holder and an adapter, said tool holder including a cylindrical main portion and an integrally attached cylindrical tail portion, said main portion and said tail portion having cylindrical precision formed bearing surfaces, the end of said main portion having a bead formed thereon, the diameter of the beaded portion slightly less than the diameter of the cylindrical main portion, the region immediately adjacent said beaded portion recessed axially, said adapter having a cylindrical bore and a cylindrical counter-bore, the walls of said cylindrical bore precision ground and shaped to receive and support the cylindrical precision ground bearing surfaces of said tail portion in close fitting relationship, the walls of said counter-bore precision ground and shaped to receive and support said cylindrical bearing surfaces of the main portion of the tool holder in close fitting relationship to provide the tool holder with two spaced regions of support in said adapter, means in said adapter coacting with means on said tool holder for releasably holding said tool holder in said adapter, a tool receiving bore extending through said tool holder, means in said tool holder for releasably holding the stem of a tool in said tool holder bore, said recessed region adjacent said beaded portion recessed axially a distance sufficient to permit the cylindrical main portion of said tool holder to be inserted inside the close fitting cylindrical counter-bore in said adapter without jamming.

10. The apparatus described in claim 9 wherein said bead formed on the end of said main portion is semi-circular in cross-section.

11. The apparatus described in claim 10 including two whistle notches formed on the tool holder, said whistle notches having flat surfaces at right angles to each other and inclined at an angle with respect to the radius of the main portion of the tool holder, said tail portion having alignment keys formed thereon at right angles with respect to each other and aligned with the flat of said whistle portions, the bore of said adapter provided with key receiving grooves shaped to receive the alignment keys, said adapter having threaded bores formed therein communicating with said counter-bore, said threaded bores inclined at an angle with respect to the radius of said adapter, and at right angles with respect to each other, flat ended screws counter-sunk in said adapter, whereby when said tool holder is inserted in said adapter with the keys on said tail portion entering the grooves in said bore the flat surfaces of said whistle notches will be at right angles with respect to said threaded bores in said adapter whereby said flat ended screws can be screwed into threaded abutting locking engagement with said tool holder.

12. The apparatus described in claim 11 wherein the end of said tool holder remote from said beaded portion is threaded, a knurled positioning nut in threaded engagement with said threaded portion for controlling the penetration of said tool holder inside said adapter.

13. A tool holder described in claim 1 wherein said first and second cylindrical bodies are co-axial.

References Cited
UNITED STATES PATENTS

| | | | |
|---|---|---|---|
| 3,444,781 | 5/1969 | Sunderman et al. | 279—9 R |
| 1,929,869 | 10/1933 | Hassner | 279—76 |

GIL WEIDENFELD, Primary Examiner

U.S. Cl. X.R.

279—1 A, 9 R

UNITED STATES PATENT OFFICE
CERTIFICATE OF CORRECTION

Patent No. 3,664,677    Dated May 23, 1972

Inventor(s) Elwin Sunderman, et. al.

It is certified that error appears in the above-identified patent and that said Letters Patent are hereby corrected as shown below:

Column 4, line 70, "combination a tool holder and an adapter, said tool holder" should read -- part way there through, means in said tool holder for -- .

Signed and sealed this 19th day of December 1972.

(SEAL)
Attest:

EDWARD M. FLETCHER, JR.
Attesting Officer

ROBERT GOTTSCHALK
Commissioner of Patents